(12) United States Patent
Imamura et al.

(10) Patent No.: US 7,105,211 B2
(45) Date of Patent: Sep. 12, 2006

(54) LIQUID CRYSTAL ALIGNING AGENT, LIQUID CRYSTAL ALIGNING FILMS, AND LIQUID CRYSTAL DISPLAY DEVICES

(75) Inventors: Tetsuya Imamura, Chiba (JP); Hideyuki Nawata, Chiba (JP); Hideyuki Endo, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/514,845

(22) PCT Filed: May 20, 2003

(86) PCT No.: PCT/JP03/06272

§ 371 (c)(1),
(2), (4) Date: Nov. 18, 2004

(87) PCT Pub. No.: WO03/100510

PCT Pub. Date: Dec. 4, 2003

(65) Prior Publication Data

US 2005/0179006 A1  Aug. 18, 2005

(30) Foreign Application Priority Data

May 23, 2002  (JP) .............................. 2002-148621

(51) Int. Cl.
C09K 19/56  (2006.01)
G02F 1/1337  (2006.01)

(52) U.S. Cl. ..................... 428/1.2; 428/1.25; 428/1.26; 428/473.5; 528/170; 528/188; 528/353; 349/135; 522/170

(58) Field of Classification Search ................. 428/1.2, 428/1.25–1.26, 1.53–1.54, 473.5; 528/170, 528/188, 353; 349/123–124, 135; 522/170
See application file for complete search history.

(56) References Cited

U.S. PATENT DOCUMENTS

| | | | |
|---|---|---|---|
| 5,670,084 A * | 9/1997 | Harada et al. | 252/299.01 |
| 6,001,277 A * | 12/1999 | Ichimura et al. | 252/299.4 |
| 6,080,832 A * | 6/2000 | Chen et al. | 528/170 |
| 6,103,322 A * | 8/2000 | Gibbons et al. | 428/1.25 |
| 6,649,230 B1 * | 11/2003 | Seiberle et al. | 428/1.2 |
| 6,746,730 B1 | 6/2004 | Tanioka et al. | 428/1.1 |
| 6,833,421 B1 * | 12/2004 | Marck | 526/326 |

FOREIGN PATENT DOCUMENTS

| | | |
|---|---|---|
| EP | 0 249 881 | 12/1987 |
| EP | 0 503 918 | 9/1992 |
| EP | 1 308 771 | 5/2003 |
| GB | 2 101 760 | 1/1983 |
| JP | 63-77023 | 4/1988 |
| JP | 6-202118 | 7/1994 |
| JP | 11-326912 | 11/1999 |
| WO | WO 01/00732 | 1/2001 |
| WO | WO 02/05024 | 1/2002 |

* cited by examiner

OTHER PUBLICATIONS

Seiberle et al, WO 00/59966, Oct. 12, 2000.*

*Primary Examiner*—Harold Pyon
*Assistant Examiner*—Sow-Fun Hon
(74) *Attorney, Agent, or Firm*—Oblon, Spivak, McClelland, Maier & Neustadt, P.C.

(57) ABSTRACT

A liquid crystal alignment treating agent for optical alignment treatment, whereby it is possible to obtain a liquid crystal alignment film which presents a high and stable tilt angle of liquid crystal and which is excellent in an accumulated charge property by a DC voltage, is provided.

A liquid crystal alignment treating agent which comprises, as resin components, a polyimide precursor or a polyimide obtained by cyclodehydration of the polyimide precursor, and an acryl polymer having repeating units represented by the formula (II):

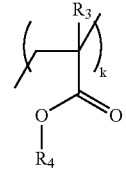

[II]

(wherein $R^3$ represents a hydrogen atom, a methyl group or a halogen atom, $R^4$ represents an alkyl group having at least 8 carbon atoms, and k represents a positive represented by the formula (III):

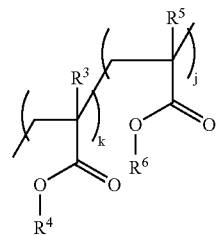

[III]

(wherein $R^3$ and $R^5$ each independently represents a hydrogen atom, a methyl group or a halogen atom, $R^4$ represents an alkyl group having at least 8 carbon atoms, $R^6$ represents an organic group having an epoxy group, and k and j each represents a positive integer), wherein the acryl polymer having the repeating units represented by the formula (II) or the formula (III) is from 0.01 to 30 wt % based on the whole resin components.

6 Claims, No Drawings

LIQUID CRYSTAL ALIGNING AGENT, LIQUID CRYSTAL ALIGNING FILMS, AND LIQUID CRYSTAL DISPLAY DEVICES

This application is a 371 of PCT/JP03/06272, filed May 20, 2003.

TECHNICAL FIELD

The present invention relates to a liquid crystal alignment treating agent for optical alignment treatment, a liquid crystal alignment film prepared by irradiating a coating film of the liquid crystal alignment treating agent with UV rays, and a liquid crystal display device employing the liquid crystal alignment film.

BACKGROUND ART

Presently, as a liquid crystal alignment film for a liquid crystal display device, a rubbing alignment film obtained by rubbing a polyimide resin film is commonly employed. However, by such alignment treatment by a rubbing method, it is difficult to treat a large area uniformly, and fine dust or scratches on the alignment film surface formed by rubbing tend to cause deterioration of the characteristics of the liquid crystal device. As a substitute for the rubbing alignment film, an optical alignment film obtainable by irradiating an organic film with polarized UV rays or the like is being strenuously studied.

As fundamental properties required for the liquid crystal alignment film, it may firstly be mentioned that liquid crystal molecules be aligned uniformly, and an optionally set tilt angle be maintained stably. Further, it will also be important that when it is employed in a liquid crystal device, the voltage retention ratio be high, and the accumulation charge by a DC voltage be low. It is known that such properties are substantially influenced by the composition or molecular structure of the liquid crystal alignment film, and various methods have heretofore been studied for the rubbing alignment film. For example, as a method to increase the tilt angle of liquid crystal molecules in a rubbing alignment film, a method of introducing a long chain alkyl group or a fluoroalkyl group to a side chain of polyimide is known (JP-A-2-282726). Further, as a method to improve the properties such as the voltage retention ratio or the accumulation charge by means of a rubbing alignment film, a method of adding an acryl additive to a polymer alignment film has been proposed (JP-A-6-202118).

On the other hand, an optical alignment film is regarded as a prospective substitute for the rubbing alignment film. However, an optical alignment film fully satisfying the same properties as the rubbing film has not yet been found. Particularly, with respect to the alignment regulating power or the stability for liquid crystal, there are many problems yet to be solved.

The present invention has been made in view of the above-mentioned problems and has an object to provide a liquid crystal alignment treating agent whereby it is possible to obtain a liquid crystal alignment film which presents a high and stable tilt angle of liquid crystal when employed as an optical alignment film, and which is excellent in the charge accumulation property by a DC voltage.

DISCLOSURE OF THE INVENTION

The present inventors have conducted an extensive study to solve the above-mentioned problems and, as a result, have arrived at the present invention having the following gist.

Namely, the present invention provides a liquid crystal alignment treating agent, characterized in that a resin component comprises a polyimide precursor having repeating units represented by the formula (I):

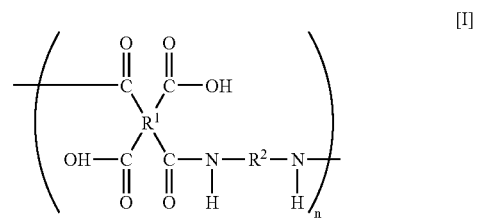

(wherein $R^1$ represents a tetravalent organic group constituting a tetracarboxylic acid, $R^2$ represents a bivalent organic group constituting a diamine, and n represents a positive integer) or a polyimide obtained by cyclodehydration of the precursor, and an acryl polymer having repeating units represented by the formula (II):

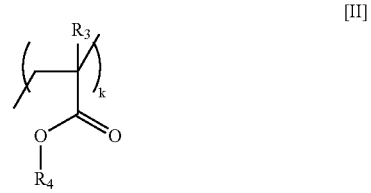

(wherein $R^3$ represents a hydrogen atom, a methyl group or a halogen atom, $R^4$ represents an alkyl group having at least 8 carbon atoms, and k represents a positive integer) or the formula (III):

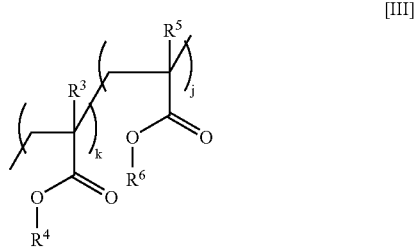

(wherein $R^3$ and $R^5$ each independently represents a hydrogen atom, a methyl group or a halogen atom, $R^4$ is an alkyl group having at least 8 carbon atoms, $R^6$ is an organic group having an epoxy group, and k and j each represents a positive integer), wherein the acryl polymer having the repeating units represented by the formula (II) or the formula (III) is from 0.01 to 30 wt % based on the whole resin component.

This liquid crystal alignment treating agent has been found to form a liquid crystal alignment film for an optical alignment treatment, whereby problems due to rubbing treatment can be avoided, and to provide a liquid crystal device having excellent properties since the tilt angle of liquid crystal is high and stable and the accumulation charge is low.

Thus, the present invention has the following characteristics as its gist.

1. A liquid crystal alignment treating agent for optical alignment treatment, which is a liquid crystal alignment treating agent having a resin component dissolved in an organic solvent, characterized in that the resin component comprises a polyimide precursor having a weight average molecular weight (Mw) of from 2,000 to 500,000 and having repeating units represented by the formula (I):

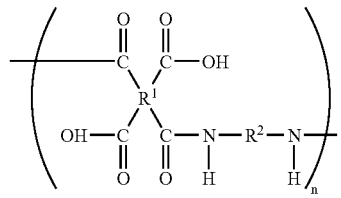

(wherein $R^1$ represents a tetravalent organic group constituting a tetracarboxylic acid, $R^2$ represents a bivalent organic group constituting a diamine, and n represents a positive integer) or a polyimide obtained by cyclodehydration of the precursor, and an acryl polymer having a weight average molecular weight (Mw) of from 1,000 to 1,000,000 and having repeating units represented by the formula (II):

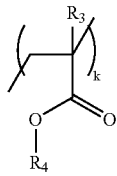

(wherein $R^3$ represents a hydrogen atom, a methyl group or a halogen atom, $R^4$ represents an alkyl group having at least 8 carbon atoms, and k represents a positive integer), and the acryl polymer having the repeating units represented by the formula (II) is from 0.01 to 30 wt % based on the whole resin component.

2. A liquid crystal alignment treating agent for optical alignment treatment, which is a liquid crystal alignment treating agent having a resin component dissolved in an organic solvent, characterized in that the resin component comprises a polyimide precursor having a weight average molecular weight (Mw) from 2,000 to 500,000 and having repeating units represented by the formula (I):

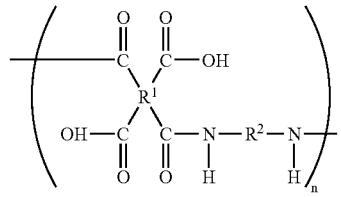

(wherein $R^1$ represents a tetravalent organic group constituting a tetracarboxylic acid, $R^2$ represents a bivalent organic group constituting a diamine, and n represents a positive integer) or a polyimide obtained by cyclodehydration of the polyimide precursor, and an acryl polymer having a weight average molecular weight from 1,000 to 1,000,000 and having repeating units represented by the formula (III):

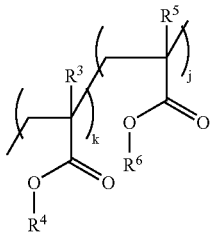

(wherein $R^3$ and $R^5$ each independently represents a hydrogen atom, a methyl group or a halogen atom, $R^4$ represents an alkyl group having at least 8 carbon atoms, $R^6$ represents an organic group having an epoxy group, and k and j each represents a positive integer), and the acryl polymer having the repeating units represented by the formula (III) is from 0.01 to 30 wt % based on the whole resin component 3. The liquid crystal alignment treating agent according to 1 or 2, wherein in the formula (I), at least 1 mol % of $R^2$ is a bivalent organic group having an alkyl group having at least 6 carbon atoms as a side chain.

4. The liquid crystal alignment treating agent according to 1 or 2, wherein in the formula (I), $R^1$ is a tetravalent organic group having an alicyclic structure.

5. The liquid crystal alignment treating agent according to 1 or 2, wherein in the formula (I), $R^1$ is a cyclobutane ring.

6. A liquid crystal alignment film obtained by coating the liquid crystal alignment treating agent as defined in any one of 1 to 5 on a substrate to form a film, followed by irradiating the film with UV rays for optical alignment treatment.

7. A liquid crystal display device employing the liquid crystal alignment film as defined in 6.

MODE FOR CARRYING OUT THE INVENTION

Now, the present invention will be described in detail.

The liquid crystal alignment treating agent of the present invention is a resin vanish having a resin component dissolved in an organic solvent, and the resin component comprises "a polyimide precursor having repeating units represented by the formula (I) or a polyimide obtained by cyclodehydration of the polyimide precursor" (hereinafter referred to as component A) and "an acryl polymer having repeating units represented by the formula (II) or the formula (III)" (hereinafter referred to as component B), as essential components.

The liquid crystal alignment treating agent of the present invention is obtained by mixing component A and component B in an organic solvent. The mixing method may, for example, be a method wherein component B is directly added into a solution of component A, or a method wherein component A and component B are dissolved in organic solvents, respectively, and then these solutions are mixed. However, it is not particularly limited.

In the liquid crystal alignment treating agent of the present invention, the content ratio of component B is from 0.01 to 30 wt %, preferably from 0.5 to 20 wt %, more preferably from 1 to 15 wt %, based on the whole resin component weight. If the ratio of component B is less, it tends to be difficult to attain the desired tilt angle. If the ratio of component B is excessive, the film forming property tends to deteriorate.

Further, component A needs not to be a single component polymer, and it may be a mixture of the polyimide precursor and the polyimide. Similarly, component B may be a mixture of two or more acryl polymers. Furthermore, another resin component may be incorporated in addition to component A and component B so long as the effects of the present invention will not thereby be lost.

The organic solvent to be used for the liquid crystal alignment treating agent of the present invention is not particularly limited so long as it is capable of dissolving the resin component uniformly. It may, for example, be 2-pyrrolidone, N-methyl-2-pyrrolidone, N-ethyl-2-pyrrolidone, N-vinyl-2-pyrrolidone, N,N-dimethylacetamide, N,N-dimethylformamide, or γ-butyrolactone. Such an organic solvent may be a single component solvent or a mixed solvent containing several kinds.

Further, even a solvent which does not dissolve the polymer when used alone, may be used in combination with the above-mentioned solvent within a range where the polymer will not precipitate. As such a solvent, ethyl cellosolve, butyl cellosolve, ethyl carbitol, butyl carbitol, ethyl carbitol acetate, ethylene glycol, a propylene glycol derivative or a lactic acid derivative may, for example, be mentioned. Such a solvent has an effect to improve the coating uniformity when film formation is carried out by coating the liquid crystal alignment treating agent.

Furthermore, in order to improve adhesiveness between the liquid crystal alignment film and a substrate, an additive such as a silane coupling agent may be added to the liquid crystal alignment treating agent.

The concentration of the resin component in the liquid crystal treating agent of the present invention is not particularly limited, but is preferably from 2 to 10 wt %, more preferably from 3 to 8 wt %.

The liquid crystal alignment treating agent of the present invention may, usually, be formed into a film on a substrate, such as a glass substrate provided with electrodes, a glass substrate provided with a color filter or a glass substrate provided with electrodes having a pattern formed, by a method such as spin coating or printing. However, the printing method is preferred from the viewpoint of productivity. Such a printing method is usually carried out at a temperature of from 20 to 30° C. under a humidity of at most 60%. The liquid crystal alignment treating agent formed into a film, is subjected to drying treatment by using a hotplate or an oven at a temperature of from 40 to 120° C., and then fired by using the hotplate or the oven to form a cured film. The firing temperature at that time can be optionally selected from 120 to 350° C., but it is preferably from 120° C. to 250° C. Further, the firing time can be optionally selected from 3 to 180 minutes including the temperature-raising and lowering periods. The thickness of the cured film is not particularly limited. However, when used as an usual liquid crystal alignment film, from 10 to 3000 nm is appropriate.

As mentioned above, the cured film obtained from the liquid crystal alignment treating agent of the present invention may be employed as a liquid crystal alignment film by optical alignment treatment.

The method of the optical alignment treatment is not particularly limited. However, it is preferred to employ polarized UV rays in order to obtain uniform liquid crystal alignment. In such a case, a method of irradiating polarized UV rays is not particularly limited. It may be irradiated by rotating the plane of polarization or may be irradiated twice or more by changing the incidence angle of polarized UV rays. Further, as long as polarization can be obtained substantially, non-polarized UV rays may be irradiated as inclined at a specific angle from the normal line of the substrate.

The wavelength of UV rays to be used for the optical alignment treatment is not particularly limited. However, it is usually within a range of preferably from 100 to 400 nm, more preferably from 200 to 380 nm. It is further preferred to select an appropriate wavelength through a filter or the like. Further, the irradiation time of UV rays is usually within a range of from a few seconds to a few hours. However, it may suitably be selected.

The liquid crystal alignment film having optical alignment treatment applied as described above, may be used to produce a liquid crystal cell by a known method, which may then be used as a liquid crystal display device.

Component A

The polyimide precursor having repeating units represented by the formula (I) used in the present invention is obtained by reacting a tetracarboxylic dianhydride with a diamine compound in an organic solvent.

The tetracarboxylic dianhydride to be used in the synthetic reaction for the polyimide precursor is not particularly limited. However, it may, for example, be a dianhydride of an aromatic tetracarboxylic acid such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl)ether, 3,3'4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid or 2,6-bis(3,4-dicarboxyphenyl)pyridine, a dianhydride of an alicyclic tetracarboxylic acid such as 1,2,3,4-cyclobutanetetracarboxylic acid, 1,2,3,4-cyclopentanetetracarboxylic acid, 1,2,4,5-cyclohexanetetracarboxylic acid, 2,3,5-tricarboxylcyclopentylacetic acid or 3,4-dicarboxy-1,2,3,4-tetrahydro-1-naphthalenesuccinic acid, or a dianhydride of an aliphatic tetracarboxylic acid such as 1,2,3,4-butanetetracarboxylic acid. These acid dianhydrides may be used alone or in combination as a mixture of a plurality of them.

From the viewpoint of alignment uniformity of the liquid crystal, it is preferred to employ a tetracarboxylic dianhydride having a benzophenone structure or an alicyclic structure. Particularly, it is preferred to employ a tetracarboxylic dianhydride having a cyclobutane structure and, specifically, it is preferred to employ 1,2,3,4-cyclobutanetetracarboxylic dianhydride.

The diamine compound to be used in the synthetic reaction for the polyimide precursor is not particularly limited. However, it may, for example, be an aromatic diamine such as p-phenylenediamine, m-phenylenediamine, 2,5-diaminotoluene, 2,6-diaminotoluene, 4,4'-diaminobiphenyl, 3,3',-dimethyl-4,4',-diaminobiphenyl, 3,3',-dimethoxy-4,4'-diaminobiphenyl, diaminodiphenylmethane, diaminodiphenyl ether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy) benzene, 1,4-bis(4-aminophenyl)benzene, 9,10-bis(4-aminophenyl)anthracene, 1,3-bis(4-aminophenoxy)

benzene, 4,4',-bis(4-aminophenoxy)diphenylsulfone, 2,2-bis [4-(4-aminophenoxy)phenyl]propane, 2,2-bis(4-aminophenyl)hexafluoropropane or 2,2-bis[4-(4-aminophenoxy)phenyl]hexafluoropropane, an alicyclic diamine such as bis(4-aminocyclohexyl)methane or bis(4-amino-3-methylcyclohexyl)methane, an aliphatic diamine such as 1,2-diaminoethane, 1,3-diaminopropane, 1,4-diaminobutane or 1,6-diaminohexane, or a silicon diamine such as 1,3-bis(3-aminopropyl)-1,1,3,3-tetramethyldisiloxane. These diamines may be used alone or in combination as a mixture of a plurality of them.

Further, in order to improve the compatibility with the acryl polymer represented by the formula (II) or the formula (III) or the film forming property, it is preferred to use a diamine having a long chain alkyl group having at least 6 carbon atoms, preferably at least 12 carbon atoms as a side chain, in combination. The carbon number of the long chain alkyl group may optionally be selected depending on the amount of the diamine to be used, the compatibility with the acryl polymer represented by the formula (II) or the formula (III), the film forming property or the like. However, if the carbon number is excessive, the compatibility or the film forming property tends to deteriorate. Thus, it is preferably at most 30, more preferably at most 20.

Such a diamine may, for example, be 1,3-diamino-4-dodecyloxybenzene, 1,3-diamino-4-hexadecyloxybenzene or 1,3-diamino-4-octadecyloxybenzene. The proportion of the diamine having a long chain alkyl group as a side chain to be used may optionally be set depending on the purpose such as improvement in the compatibility, the coating property, the liquid crystal alignment property or the like. However, it is preferably from 1 to 30%, more preferably from 5 to 15%, based on the total diamine to be used.

The proportions of the tetracarboxylic dianhydride and the diamine compound to be used in the synthetic reaction for the polyimide precursor are preferably such that the molar ratio of the diamine compound is from 0.8 to 1.2 based on the molar amount of the tetracarboxylic dianhydride. Like in a usual polycondensation reaction, the closer to 1.0 this molar ratio is, the larger the polymerization degree of the formed polymer becomes.

If the polymerization degree is too small, the strength of the film obtained by the polymerization tends to be insufficient. If the polymerization degree is excessive, the working efficiency at the time of the film forming tends to be poor. Accordingly, the polymerization degree of the product of the present reaction may be from 2,000 to 500,000, preferably from 5,000 to 200,000, as represented by the weight average molecular weight (Mw) measured in accordance with GPC (Gel Permeation Chromatography) measurement.

The synthetic reaction for the polyimide precursor is carried out in an organic solvent usually at a temperature of from 0 to 150° C., preferably from 0 to 100° C.

Such an organic solvent is not particularly limited so long as it is capable of dissolving the polymer formed by the reaction. As a specific example, N,N-dimethylformamide, N,N-dimethylacetamide, N-methyl-2-pyrrolidone, N-methylcaprolactam, dimethylsulfoxide, tetramethyl urea, pyridine, dimethyl sulfone, hexamethylsulfoxide or γ-butyrolactone, may be mentioned. These solvents may be used alone or in combination as a mixture. Further, even a solvent which does not dissolve the polyimide precursor, may be used as mixed to the above-mentioned solvent within a range where the polyimide precursor formed by the polymerization will not precipitate.

The amount of the above-mentioned organic solvent to be used is usually adjusted so that the total amount of the tetracarboxylic dianhydride and the diamine compound is preferably from 0.1 to 30 wt % based on the entire amount of the reaction solution.

The polyimide precursor obtained in such a manner may be used as it is or may be used after precipitated in a poor solvent such as methanol, ethanol or the like, separated, washed and recovered.

The polyimide obtained by cyclodehydration of the polyimide precursor comprising the repeating units represented by the formula (I) is one obtained by cyclodehydration of the polyimide precursor by a known method. The polyimide here includes one wherein not all of repeating units of the polyimide precursor, may have been subjected to imidization (cyclodehydration), and such a polyimide may also suitably be used for the liquid crystal alignment treating agent of the present invention.

Usually, the higher the degree of imidization is, the lower the solubility of the polymer in an organic solvent becomes. However, by variously selecting the structure of the polyimide precursor, it is possible to obtain a polyimide which is soluble in an organic solvent even though its degree of imidization is 90% or higher. For example, a polyimide precursor synthesized by employing, as the tetracarboxylic dianhydride component, 3,4-dicarboxy-1,2,3,4-tetrahydro-1-naphthalenesuccinic dianhydride, bicyclo[3,3,0]-octane-tetracarboxylic dianhydride, 2,3,5-tricarboxycyclopentyl acetic dianhydride or 1,2,3,4-butanetetracarboxylic dianhydride, shows excellent solubility in an organic polar solvent such as N-methyl-2-pyrrolidone, N,N-dimethyl acetamide, N,N-dimethyl formamide or γ-butyrolactone even though it is converted to the polyimide having the high degree of imidization.

The method of cyclodehydration may, for example, be a method wherein cyclodehydration is carried out by heating or a method wherein cyclodehydration is carried out chemically by employing a conventional cyclodehydration catalyst.

In the method by heating, an optional temperature of preferably from 100° C. to 300° C., more preferably from 120° C. to 250° C., may be selected for use. Further, when heating is carried out in the solution, if the temperature exceeds 200° C., the molecular weight of the polyimide sometimes becomes low.

In the method of chemical cyclodehydration, a method is common wherein a dehydrating agent or a cyclodehydration catalyst is added to a polyimide precursor in an organic solvent and, if necessary, heating is carried out.

As the dehydrating agent, an acid anhydride such as acetic anhydride, propionic anhydride or trifluoroacetic anhydride may, for example, be used. The amount of the dehydrating agent to be used is preferably from 0.01 to 20 mol per 1 mol of the repeating units of the polyimide precursor. Further, as the cyclodehydration catalyst, a tertiary amine such as pyridine or triethylamine may, for example, be used. The amount of the cyclodehydration catalyst to be used is preferably from 0.01 to 10 mol per 1 mol of the dehydrating agent to be used. Further, the organic solvent to be used for the cyclodehydration reaction may be the organic solvent mentioned as one to be used for the synthesis of the polyimide precursor. The reaction temperature for the cyclodehydration reaction is usually from 0 to 180° C., preferably from 10 to 150° C.

The polyimide obtained in such a manner may be used as it is or may be used after precipitated in a poor solvent such as methanol, ethanol or the like, separated, washed and recovered.

Component B

The acryl polymer having repeating units represented by the formula (II) or the formula (III) is an acryl polymer having a long chain alkyl group as a side chain, and it may be obtained in accordance with a usual method for obtaining an acryl polymer. Specifically, it may be obtained by dissolving such an acryl monomer in an organic solvent and adding AIBN (azobisisobutyronitrile) as a polymerization initiator. The polymerization degree of the acryl polymer to be used in the present invention is from 1,000 to 1,000,000, preferably from 2,000 to 100,000, as represented by the weight average molecular weight (Mw).

$R^3$ of the repeating units represented by the formula (II) is a hydrogen atom, a methyl group or a halogen atom, preferably a hydrogen atom or a methyl group. Further, $R^4$ is an alkyl group having at least 8 carbon atoms. $R^3$ and $R^5$ of the repeating units represented by the formula (III) each independently is a hydrogen atom, a methyl group or a halogen atom, preferably a hydrogen atom or a methyl group. Further, $R^4$ is an alkyl group having at least 8 carbon atoms, and $R^6$ is an organic group having an epoxy group. If the carbon number of $R^4$ is less than 8, it tends to be difficult to make the tilt angle of the liquid crystal high. Further, if the carbon number of $R^4$ is more than 20, it also tends to be difficult to obtain the tilt angle of the liquid crystal, and besides, the solubility of the acryl polymer or its compatibility with the polyimide precursor or the polyimide tends to be poor, and when it is formed into a film, the film thickness tends to be non-uniform. Thus, the carbon number of $R^4$ is preferably from 8 to 20, more preferably from 12 to 18.

The acryl monomer corresponding to the repeating units represented by the formula (II) may, for example, be octyl methacrylate, octyl acrylate, n-dodecyl methacrylate, n-hexadecyl methacrylate, n-hexadecyl acrylate, n-octadecyl methacrylate or n-octadecyl acrylate.

Further, in order to improve the characteristics such as the solubility in a solvent, the compatibility with the polyimide precursor or the polyimide and the heat resistance of the coating film, the acryl polymer comprising the repeating units represented by the formula (II), may preferably be a copolymer wherein at least one acryl monomer having various side chain structures is added.

Such an acryl monomer may, for example, be styrene, hydroxystyrene, carboxystyrene, methacrylamide, N-aryl methacrylamide, N-hydroxyethyl-N-methyl methacrylamide, N-methyl-N-phenylmethacrylamide, acrylamide, N-arylacrylamide, N,N-arylacrylamide, N-methyl-N-phenylacrylamide, N-vinyl-2-pyrrolidone, N-phenylmaleimide, glycidyl methacrylate or vinylcarbazole.

The acryl polymer comprising the repeating units represented by the formula (III) is a copolymer of a acryl monomer corresponding to the repeating units represented by the formula (II) and an acryl monomer having an epoxy group.

By copolymerizing the acryl monomer having an epoxy group, the solubility of the acryl polymer and the compatibility with component A of the present invention will be improved. Particularly, glycidyl methacrylate is preferably employed because of its excellent effects to improve the solubility and the compatibility.

The proportions of the copolymerization of the acryl monomer corresponding to the repeating units represented by the formula (II) and another acryl monomer may optionally be set. However, another acryl monomer is preferably at most 95%, more preferably at most 80%. If the proportion of the acryl monomer corresponding to the repeating units represented by the formula (II) is less than 5%, it tends to be difficult to increase the tilt angle of the liquid crystal.

Now, the present invention will be described with reference to Examples, but the present invention is by no means restricted by these Examples.

EXAMPLES

Synthesis Example 1

18.02 g (0.09 mol) of 4,4'-diaminodiphenyl ether and 3.77 g (0.01 mol) of 1,3-diamino-4-octadecyloxybenzene were dissolved in 234 g of N-methyl-2-pyrrolidone (hereinafter, referred to as "NMP"). Then, 19.61 g (0.1 mol) of 1,2,3,4-cyclobutanetetracarboxylic dianhydride was added thereto, followed by reaction at room temperature for 24 hours, to obtain a polyimide precursor. This solution was diluted with NMP to bring the solid content resin concentration to be 3 wt %, whereby a polyimide precursor solution (A-1) was obtained. The polymerization degree of the obtained polyimide precursor was 133,000, as represented by the weight average molecular weight (Mw).

Synthesis Example 2

A polyimide precursor solution (A-2) having a solid content concentration of 3% was obtained in the same manner as in Synthesis Example 1 except that 16.02 g (0.08 mol) of 4,4'-diaminodiphenyl ether and 7.53 g (0.02 mol) of 1,3-diamino-4-octadecyloxybenzene were used. The polymerization degree of the obtained polyimide precursor was 69,000, as represented by the weight average molecular weight (Mw).

Synthesis Example 3

A polyimide precursor solution (A-3) having a solid content concentration of 3 wt % was obtained in the same manner as in Synthesis Example 1 except that 9.73 g (0.09 mol) of p-phenylenediamine was used instead of 4,4'-diaminodiphenyl ether. The polymerization degree of the obtained polyimide precursor was 107,000, as represented by the weight average molecular weight (Mw).

Synthesis Example 4

12.72 g (0.05 mol) of n-dodecyl methacrylate and 7.11 g (0.05 mol) of glycidyl methacrylate were dissolved in 102 g of NMP, then inside of the flask was flushed with nitrogen, and the temperature was raised to 70° C. After the temperature rise, 0.2 g of azobisisobutyronitrile (AIBN) dissolved in 10 g of NMP was added under nitrogen pressure, followed by reaction for 24 hours. After cooling, the reaction solution was put in methanol, and the polymer was re-precipitated and dried by heating. 0.3 g of this polymer was dissolved in 9.7 g of NMP to obtain an acryl polymer solution (B-1) having a solid content concentration of 3 wt %. The polymerization degree of this acryl polymer was 32,000, as represented by the weight average molecular weight (Mw).

Synthesis Example 5

1.78 g (0.007 mol) of n-dodecyl methacrylate and 13.22 g (0.093 mol) of glycidyl methacrylate were dissolved in 102 g of NMP, then inside of a flask was flushed with nitrogen, and the temperature was raised to 70° C. After the temperature rise, 0.2 g of AIBN dissolved in 10 g of NMP was added under nitrogen pressure, followed by reaction for 24 hours. After cooling, the reaction solution was put in methanol, and the polymer was re-precipitated and dried by heating. 0.3 g of this polymer was dissolved in 9.7 g of NMP to obtain an acryl polymer solution (B-2) having a solid content concentration of 3 wt %. The polymerization degree of this acryl polymer was 35,000, as represented by the weight average molecular weight (Mw).

Example 1

The polyimide precursor solution (A-1) and the acryl polymer solution (B-1) were mixed in a weight ratio of (A-1)/(B-1)=99/1 and thoroughly stirred to form a uniform solution thereby to obtain a liquid crystal alignment treating agent (C-1).

This liquid crystal alignment treating agent (C-1) was spin-coated at a rate of 5000 rpm on a glass substrate provided with transparent electrodes and fired at 210° C. for 60 minutes to obtain a polyimide/acryl polymer mixed film having a film thickness of 45 nm.

Polarized UV rays (wavelength: from 280 nm to 360 nm) were irradiated on this coating film by an opto-irradiation system, OptoAlign™ (E3-UV-600-A), manufactured by ELISICON under such a condition that the system setting (lamp angle) was 0 deg and the irradiation dose was 20 J, to carry out alignment treatment.

Two such alignment treated substrates were prepared. A spacer of 6 μm was sprayed on the film surface of one substrate, and the other substrate was bonded thereto so that the respective polarized directions were crossed each other, nematic liquid crystal (ZLI-4792, manufactured by Merck Ltd.) was injected, and the inlet for injection was sealed to produce a liquid crystal cell. After the production of the liquid crystal cell, heat treatment was carried out at 120° C. for 30 minutes. The alignment state of this liquid crystal cell was observed by a polarization microscope, whereby uniform alignment without defects was observed.

With respect to this liquid crystal cell, the tilt angle was measured and found to show a very high value of 25.6°. Further, rectangular waves of 30 Hz/+3 V having a direct current of 3 V superimposed thereon were applied to this cell for 20 minutes, and immediately after the direct current of 3 V was cut off, the residual voltage remaining in the liquid crystal cell was measured by an optical flicker elimination method. As a result, it was 0.5 V, which means that the accumulated charge was low.

Further, after leaving this cell in a constant temperature vessel at 85° C. for 7 days, the tilt angle of the liquid crystal was measured again, whereby it was 21.0°, and it was also thermally stable.

Example 2

The polyimide precursor solution (A-3) and the acryl polymer solution (B-1) were mixed in a weight ratio of (A-1)/(B-1)=99/1 and stirred thoroughly to form a uniform solution thereby to obtain a liquid crystal alignment treating agent (C-1).

By using this liquid crystal alignment treating agent (C-2), a liquid crystal cell was produced and evaluated in the same manner as in Example 1. The alignment state of this liquid crystal cell was observed by a polarization microscope, whereby uniform alignment without defects was observed. The tilt angle, the accumulated charge and the tilt angle after heat treatment were 19.8°, 0.35 V and 16.40, respectively.

Example 3

The polyimide precursor solution (A-3) and the acryl polymer solution (B-2) were mixed in a weight ratio of (A-1)/(B-1)=95/5 and stirred thoroughly to form a uniform solution thereby to obtain a liquid crystal alignment treating agent (C-3).

By using this liquid crystal alignment treating agent, a liquid crystal cell was produced and evaluated in the same manner as in Example 1. The alignment state of this liquid crystal cell was observed by a polarization microscope, whereby uniform alignment without defects was observed. The tilt angle, the accumulated charge and the tilt angle after heat treatment were 1.80, 0.05 V and 1.5°, respectively.

Comparative Example 1

By employing the polyimide precursor solution (A-1) alone as an liquid crystal alignment treating agent, a liquid crystal cell was produced and evaluated in the same manner as in Example 1. As a result, the tilt angle was 1.5°, and the accumulated charge was 1.65 V. This means that the accumulated charge was large.

Comparative Example 2

By employing the polyimide precursor solution (A-2) alone as an liquid crystal alignment treating agent, a liquid crystal cell was produced and evaluated in the same manner as in Example 1. As a result, the tilt angle was 12.30, the accumulated charge was 1.50 V, and the tilt angle after heat treatment was 3.0°. The initial tilt angle was large, but by the heat treatment, the tilt angle decreased substantially. Further, the accumulated charge was also large.

Reference Example 1

By employing the polyimide precursor solution (A-1) alone as an liquid crystal alignment treating agent, a liquid crystal cell was produced by rubbing alignment treatment instead of optical alignment treatment and evaluated. The rubbing treatment was carried out under such conditions as rayon cloth, a roll diameter of 120 mm, a roll rotational speed of 300 rpm, a feed speed of 20 mm/s and a forced draft of 0.5 mm. Bonding of the substrates to each other was carried out so that the respective rubbing directions crossed each other. As a result, the tilt angle was 8.6°, the accumulated charge was 0.05 V, and the tilt angle after heat treatment was 7.2°.

Reference Example 2

By employing the polyimide precursor solution (A-2) alone as an liquid crystal alignment treating agent, a liquid crystal cell was produced and evaluated in the same manner as in Reference Example 1. As a result, the tilt angle was 42.6°, the accumulated charge was 0.10 V, and the tilt angle after heat treatment was 37.80.

INDUSTRIAL AVAILABILITY

The liquid crystal alignment treating agent of the present invention may be employed as a liquid crystal alignment film for optical alignment treatment, whereby problems due to rubbing treatment can be avoided. The liquid crystal alignment film of the present invention presents a high and stable tilt angle of liquid crystal and a small accumulated charge, whereby it is possible to obtain a liquid crystal device having excellent characteristics.

What is claimed is:

1. A liquid crystal alignment treating agent for optical alignment treatment, comprising
a resin component dissolved in an organic solvent, wherein the resin component comprises:
(i) a polyimide precursor having a weight average molecular weight (Mw) from 2,000 to 500,000 and having repeating units represented by the formula (I):

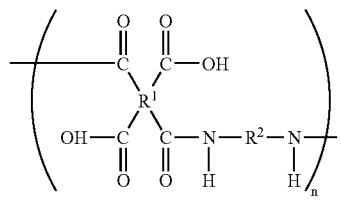

[I]

(wherein $R^1$ represents a tetravalent organic group constituting a tetracarboxylic acid, $R^2$ represents a bivalent organic group constituting a diamine, and n represents a positive integer) or a polyimide obtained by cyclodehydration of the polyimide precursor; and
(ii) an acryl polymer having a weight average molecular weight from 1,000 to 1,000,000 and having repeating units represented by the formula (III):

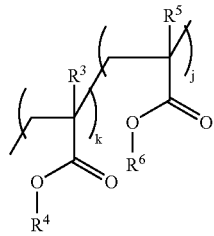

[III]

(wherein $R^3$ and $R^5$ each independently represents a hydrogen atom, a methyl group or a halogen atom, $R^4$ represents an alkyl group having at least 8 carbon atoms, $R^6$ represents an organic group having an epoxy group, and k and j each represents a positive integer), and the acryl polymer having the repeating units represented by the formula (III) is from 0.01 to 30 wt% based on the whole resin component.

2. The liquid crystal alignment treating agent according to claim 1, wherein in the formula (I), at least 1 mol% of $R^2$ is a bivalent organic group having an alkyl group having at least 6 carbon atoms as a side chain.

3. The liquid crystal alignment treating agent according to claim 1, wherein in the formula (I), $R^1$ is a tetravalent organic group having an alicyclic structure.

4. The liquid crystal alignment treating agent according to claim 1, wherein in the formula (I), $R^1$ is a cyclobutane ring.

5. A liquid crystal alignment film obtained by coating the liquid crystal alignment treating agent as defined in any one of claims 1 to 4 on a substrate to form a film, followed by irradiating the film with UV rays for optical alignment treatment.

6. A liquid crystal display device employing the liquid crystal alignment film as defined in claim 5.

* * * * *